United States Patent [19]
Saint-Pierre et al.

[11] Patent Number: 5,815,382
[45] Date of Patent: Sep. 29, 1998

[54] TRACKING CIRCUIT FOR POWER SUPPLY OUTPUT CONTROL

[75] Inventors: Roland S. Saint-Pierre, Alpharetta; Dipti V. Vashi, Lawrenceville, both of Ga.; Jose' M. Fernandez, Sunrise, Fla.

[73] Assignee: Motorola, Inc., Schaumburg, Ill.

[21] Appl. No.: 643,681

[22] Filed: May 6, 1996

[51] Int. Cl.$^6$ .................................................. G02M 3/335
[52] U.S. Cl. ................................................ 363/21; 363/97
[58] Field of Search ........................................ 323/266, 273, 323/280, 281, 282, 285, 288, 351; 363/21, 56, 97, 131

[56] References Cited

U.S. PATENT DOCUMENTS

| | | | |
|---|---|---|---|
| 4,546,423 | 10/1985 | Seki | 363/56 |
| 4,769,753 | 9/1988 | Knudson et al. | 363/60 |
| 4,881,023 | 11/1989 | Perusse et al. | 323/266 |
| 5,414,340 | 5/1995 | Gannon | 323/266 |
| 5,689,407 | 11/1997 | Marinus et al. | 363/21 |

*Primary Examiner*—Adolf Berhane
*Attorney, Agent, or Firm*—Felipe J. Farley; Scott M. Garrett

[57] ABSTRACT

A tracking circuit for a power supply comprises an inverter (68), a summing network (70), and a driver circuit (72). The inverter inverts a feedback voltage, which is a variable load voltage level, about an inverter reference voltage level to provide an inverter output voltage level. The inverter output voltage level is summed or averaged with the output voltage of the power supply with respect to the voltage of the return line (54) to provide a summing voltage. The driver circuit signals the primary control circuit (35) to adjust the power supply output voltage level so that the summing voltage is held constant and equal with a driver reference voltage level.

9 Claims, 3 Drawing Sheets

TRACKING CIRCUIT FOR POWER SUPPLY OUTPUT CONTROL

TECHNICAL FIELD

This invention relates in general to control circuitry for power supplies, and particularly to power supplies having a tracking output for powering battery chargers.

BACKGROUND

Power supplies are currently in widespread use, and are used for converting electrical energy of one form to another form. For example, a typical power supply scheme is to convert commercial AC service of 110VAC –240VAC to a low level DC voltage such as 12 volts. A common application for power supplies is in battery chargers for portable equipment, such as portable computers and cellular phones. Conventional battery chargers combine a power supply with a charge control circuit in one stand alone package. When one desires to recharge a battery, the battery is placed in a pocket of the charger, or otherwise connected to the charger, and the charger detects and charges the battery. Recently, manufacturers have begun separating these functions using a stand alone power supply and embedding the charge control circuitry in the equipment. One advantage of this is that the manufacturer has more control over the regime used to recharge a battery. When the charger is embedded in the equipment, the user has less motivation to purchase a third party charger that may be harmful to the batteries.

In integrating the charger control circuitry into a product, it is desired to minimize the amount of space the circuitry requires. The simplest charge controller circuits are designed around a typical linear regulator for controlling the recharge current. However, a linear regulator can be very inefficient, and therefore produce heat in the product, necessitating large heat sinks. Such heat sinks work against the goals of small size and weight for portable products. The alternative is to use a switch mode regulator in the product, but these produce more electrical noise than linear regulators which can affect sensitive circuitry.

One strategy that has proved beneficial is to provide a power supply with an adjustable output voltage level coupled with a linear regulator charge controller. The power supply is responsive to a feedback voltage, such as, for example, a battery voltage level. By doing so, the output voltage level of the power supply can be adjusted so that it tracks the feedback voltage, and is slightly higher than the feedback voltage by a preselected difference. The preselected difference is equal to about the minimum drop out voltage necessary for the linear regulator to function. This minimizes the power dissipation of the linear regulator's pass device, independent of load voltage level. Thus, there exists a need for a tracking circuit for power supply output voltage level control.

DETAILED DESCRIPTION OF THE PREFERRED EMBODIMENT

Figure 1:
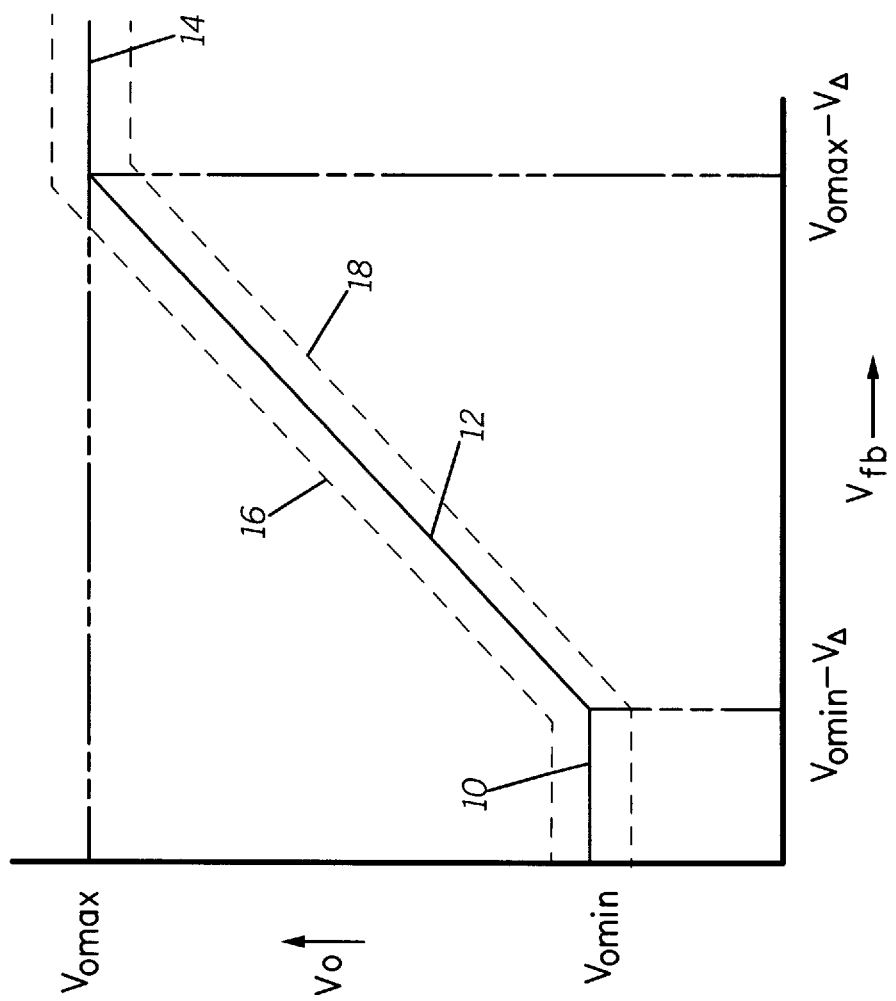
FIG. 1 is a graphical representation of the output voltage level vs. feedback voltage level in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a graphical representation of the output voltage level $V_o$ vs. feedback voltage level $V_{fb}$ in accordance with the invention. The graph is defined by a first range 10, a second range 12, and a third range 14. The upper dashed line 16 and lower dashed line 18 represent the upper and lower tolerance bounds, respectively. The output voltage level $V_o$ has a range from a minimum output voltage level $V_{omin}$ to a maximum output voltage level $V_{omax}$. In the second range 12, the output voltage level tracks the feedback voltage linearly, but is higher by a delta voltage $V_A$, such as, for example 1.4 volts. In this range, the output voltage level is always higher than the feedback voltage level by $V_{66}$. Accordingly, in the first range 10, the output voltage level remains at $V_{omin}$ while $V_{fb}$ is below $V_{omin}+V_A$. Once $V_{fb}+V_A$ reaches $V_{omin}$, the output voltage level enters the second range, and begins increasing in linear correspondence with the feedback voltage level. Similarly, in the third range, when $V_{fb}+V_A$ is equal to, or greater than $V_{omax}$, the output voltage level remains at $V_{omax}$.

One reason for setting up the limits of $V_{omin}$ and $V_{omax}$ is that, in most cases, the load voltage, from which the feedback voltage level is derived, will have a limited range, such as with a battery. A battery typically has a minimum and a maximum voltage during operation. Designing the power supply so that the output voltage level tracks the feedback voltage level over the entire range requires somewhat more sophisticated circuitry. That is, in general, it is easier to design the control loop and magnetic components of the power supply if the output voltage range is limited.

Figure 2:
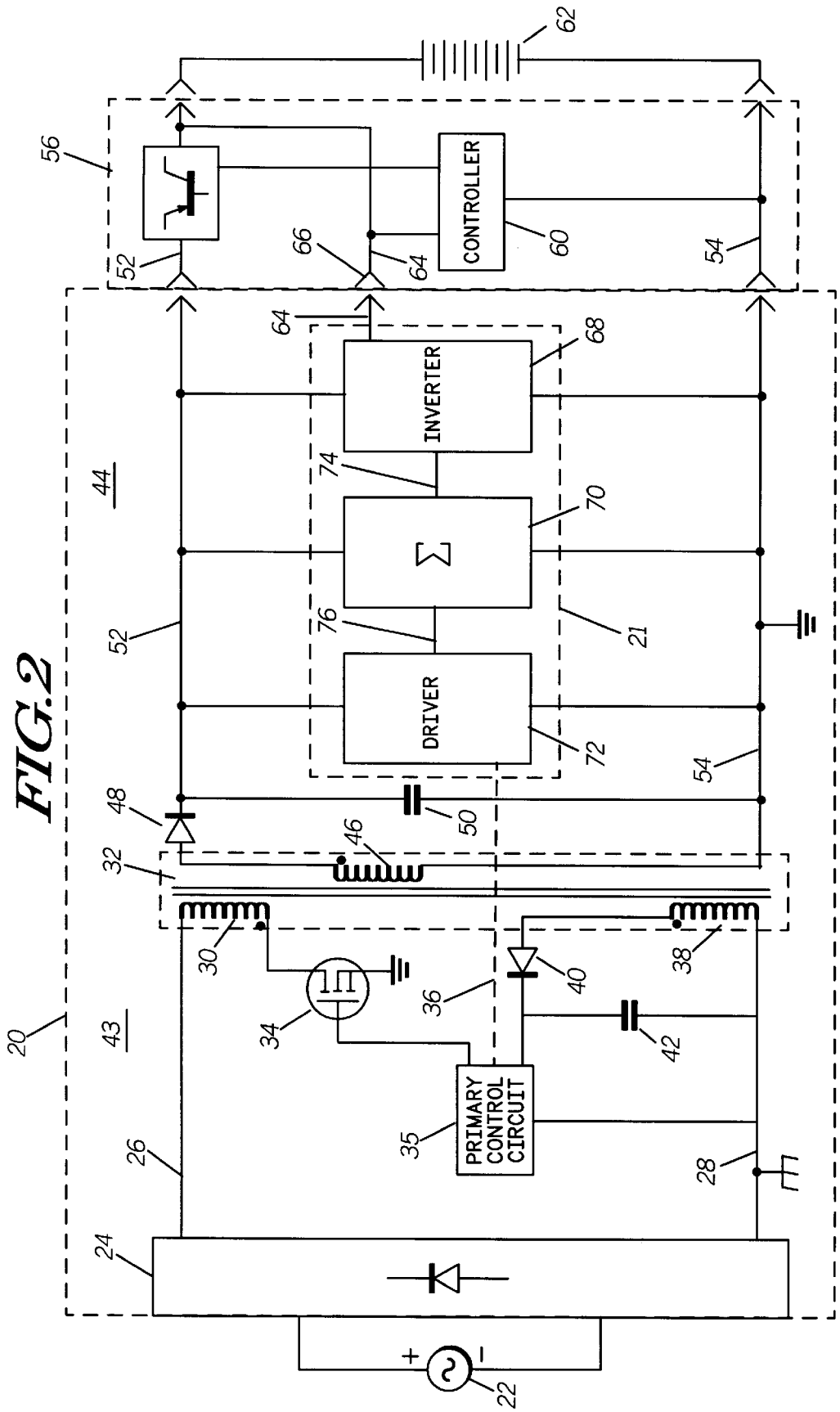
FIG. 2 is a block diagram of a power supply utilizing a tracking circuit in accordance with the invention.

Referring now to FIG. 2, there is illustrated therein a block diagram of a power supply 20 utilizing a tracking circuit 21 in accordance with the invention. The power supply 20 receives power from an external source, such as an AC source 22 that provides an AC voltage, although it is contemplated that the external source may be a DC source as well. As is common in the art, the AC voltage is rectified and filtered by a rectifier circuit 24, which is typically a rectifier bridge and filter capacitor. Many topologies exist for power conversion which may applied here, but for clarity, a typical flyback converter topology is used to illustrate how the invention operates.

The output of the rectifier circuit is a substantially DC voltage between a primary power line 26 and a primary return line 28, although there may be a significant AC component superimposed on the DC level. This voltage is fed to primary winding 30 of a transformer 32. The primary winding is coupled in series with a power switch 34 between the primary power and return lines. The power switch is controlled by a primary control circuit 35, which is responsive to a signal 36 from the tracking circuit 21, and is powered by an auxiliary winding 38 coupled to an auxiliary diode 40 and auxiliary capacitor 42. In general, while a flyback converter is essentially illustrated here, other topologies exist which can be used on the primary side 43 to energize the primary winding. However, all of these topologies will have at least one power switch and a primary control circuit that is responsive to some signal from some circuit on the secondary side 44 of the power supply.

The secondary side comprises a secondary winding 46 which, when coupled with a secondary rectifier 48 and secondary filter capacitor 50, produce the output voltage level on an output line 52. The secondary filter capacitor 50 is coupled between the output line and the return line 54. The output line and return line are connected to a device comprising a linear regulator, such as a battery charger 56, that has a pass device 58 and a controller 60. The battery charger uses the output voltage level to supply power to a battery 62 having a battery voltage which is fed back to the power supply on line 64 to a feedback terminal 66.

The tracking circuit 21 is connected to the feedback terminal 66, and comprises an inverter 68, a summing network 70, and a driver circuit 72. The feedback voltage level $V_{fb}$ on line 64 is fed to the inverter, which inverts the feedback voltage level $V_{fb}$ about an inverter reference voltage level $V_{ir}$. That is, the inverter produces an inverter output voltage level $V_{io}$ on line 74 that is equal to the difference between the inverter reference voltage level and the feedback voltage level, increased a gain factor $\beta$ which is more than one, and summed with the inverter reference voltage level. For example, if the inverter reference voltage level is 5 volts, the feedback voltage level is 6 volts, and the gain factor is 2, the inverter output voltage level would be [(5–6) X 2]+5=3 volts. If the feedback voltage level is above the inverter reference voltage level, the inverter output voltage level is below the inverter reference voltage level, and vice versa. However, the inverter output voltage level is bounded by the common, or ground potential of the return line and the output voltage level $V_o$. So, the inverter output voltage level will be the lower of either $V_o$ or the value of the formula $(V_{ir}-V_{fb})\beta+V_{ir}$, and not less than zero volts. In practice there will typically be a small error voltage associated with the inverter output voltage level at the bounds of the range.

The summing network 70 combines the inverter output voltage level on line 74 with the output voltage level on line 52 according to preselected proportions to provide a summing voltage $V_s$ on line 76. In general, the summing network is a variable voltage divider network having two inputs. In this case the inputs are $V_o$ and $V_{io}$. While either one is held constant and the other is allowed to vary, the summing voltage will vary similarly. That is, as one input increases, so to will the summing voltage in proportion. As a result, the output of the summing network would have a narrower range than $V_{io}$ if it were allowed to vary, but the summing voltage is used as a control level, and the driver circuit 72 acts to hold the summing voltage equal to a preselected driver reference voltage level by signaling the primary control circuit to change the output voltage level accordingly. For example, when the inverter output voltage decreases, as will be the case with an increasing feedback voltage level in the appropriate range, such as when recharging a battery, the summing voltage would, without more, decrease. However, the driver circuit signals the primary control circuit to increase the output voltage level so that the summing voltage remains virtually constant. In a switched mode converter, this means the primary control circuit will adjust the pulse width modulation duty cycle appropriately. Thus, the output voltage level tracks the feedback voltage level when the feedback voltage is in the appropriate range, such as the second range 12 of FIG. 1. When the feedback voltage level is above or below that of the second range in FIG. 1, the inverter output voltage level is at either its maximum level or its minimum level, and does not change when the feedback voltage level changes within the first range 10 or the third range 14, thus no change in the output voltage level is required to hold the summing voltage constant.

Figure 3:
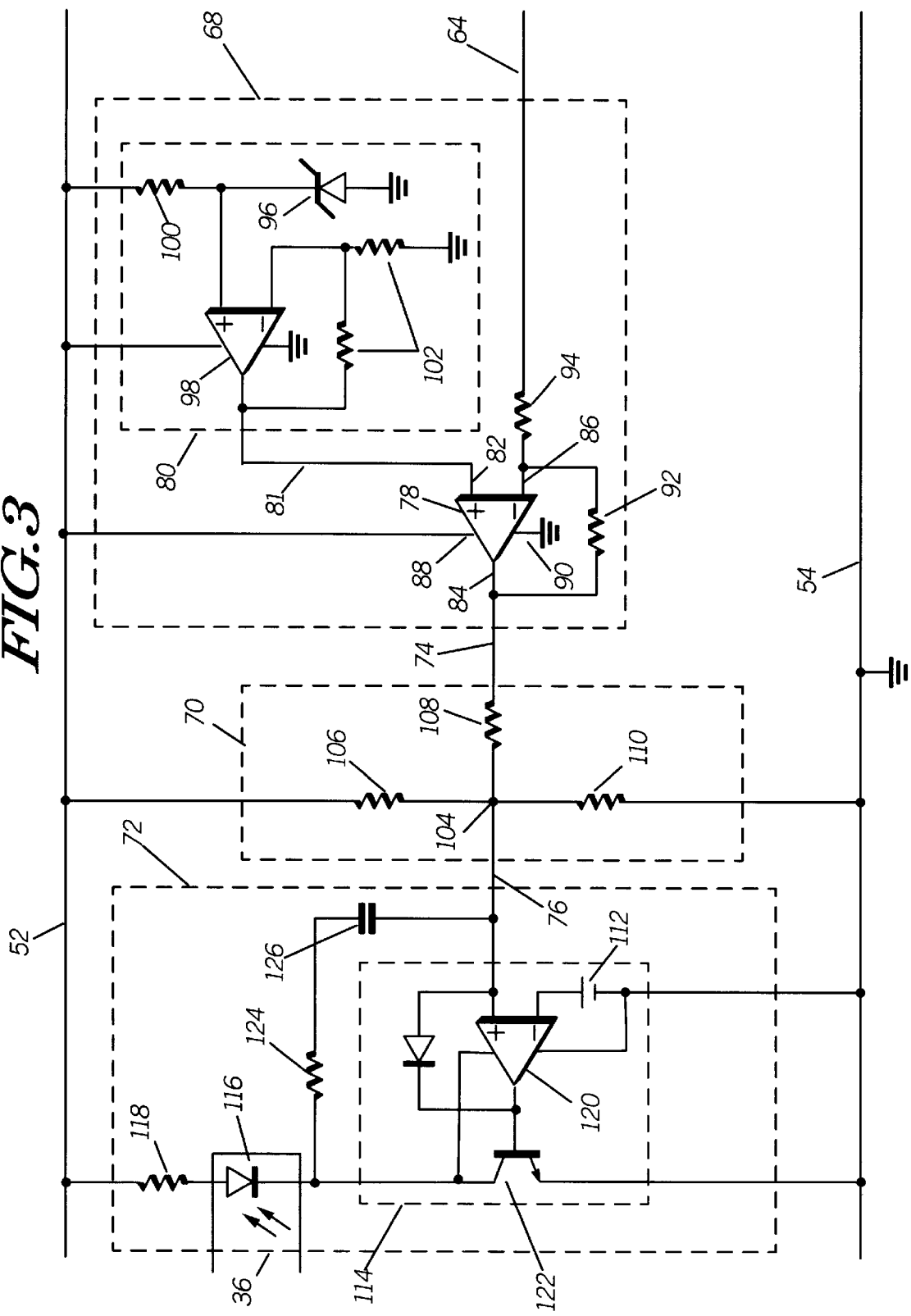
FIG. 3 is a detailed schematic diagram of a tracking circuit in accordance with the invention.

Referring now to FIG. 3, there is illustrated therein a detailed schematic diagram of a tracking circuit in accordance with the invention. As in FIG. 2, the tracking circuit comprises an integrator 68, a summing network 70, and a driver circuit 72. The integrator receives the feedback voltage level on line 64 from a feedback terminal, and provides an inverter output voltage level on line 74 to the summing network. The summing network combines the inverter output voltage level with the output voltage level on the output line 52 to provide a summing voltage on line 76. Finally, the driver circuit signals the primary control circuit with a signal 36 so that the summing voltage is virtually held constant.

The inverter 68 comprises an op-amp 78, or equivalent, and an inverter voltage reference 80. The inverter voltage reference provides an inverter reference voltage level on line 81 to the non-inverting input 82 of the op-amp. The op-amp also has an inverting input 86, an op-amp output 84, a power terminal 88, and a ground terminal 90. To provide gain and the inversion about the inverter reference voltage level, a feedback resistor 92 is connected between the op-amp output and the inverting input, and an input resistor 94 is connected between the feedback terminal and the inverting input, and the feedback resistor has a larger resistance than the input resistor.

The inverter voltage reference 80 could be any of numerous commercially available voltage references, but in the preferred embodiment it comprises a constant voltage diode 96, such as that made by National Semiconductor, Inc. and sold under the designation LM4040, for providing a regulated low voltage reference level, and an amplifier 98 for amplifying the regulated low voltage reference level to provide the inverter reference voltage level on line 81. The choice of inverter reference voltage level affects the delta voltage $V_A$ magnitude. The constant voltage diode is connected in series with a resistor 100 between the output line 52 and the return line 54. The amplifier uses a pair of feedback resistors 102 to achieve the desired level shift of the low voltage reference and produce the inverter reference voltage level. This arrangement allows the use of inexpensive constant voltage diodes, which have standardized voltage levels, to achieve a custom selected inverter reference voltage level. That is, a standardized voltage regulator providing, for example, 2.5 volts is used with an amplifier circuit having a gain of, for example, 1.75 to provide a regulated inverter reference voltage level of 4.375 volts. Of course, this is only necessary when a non-standardized voltage reference level is preferred.

The summing network 70 has a summing node 104, to which line 76 is connected, and comprises a first resistor 106 connected between the output line 52 and the summing node, a second resistor 108 connected between the inverter and the summing node, and a third resistor 110 connected between the return line 54 and the summing node. The values of the resistors determine the proportion to which each voltage level affects the summing voltage. In effect, the summing voltage is a weighted average of the output voltage level, the inverter output voltage level, and zero volts.

The driver circuit 72, which is connected to the sunning network by line 76, compares the summing voltage to a driver reference voltage level, and signals the primary control circuit to increase, decrease, or maintain the output voltage level as appropriate. In the preferred embodiment the driver circuit comprises a driver voltage reference 112 for providing the driver reference voltage level, a shunt regulator 114 responsive to the summing voltage and which may include the driver voltage reference, and a light emitting diode 116 coupled in series with the shunt regulator and a current limiting resistor 118 between the output line 52 and the return line 54. The light emitting diode is part of an opto-coupler, and is optically coupled to the primary control circuit. More specifically, it is coupled to a photo sensitive device in the opto-coupler which is part of the primary control circuit. As drawn, the shunt regulator, including the driver voltage reference, is similar to a commercially available shunt regulator sold under the trade designation TL431 by various manufacturers.

In general, a comparator 120, or similar open loop amplifier, compares the summing voltage apparent at the summing node 104 with the driver reference voltage level, and drives a pass transistor 122, which is series connected with the LED 116. The pass transistor acts as a variable resistance so that variable levels of current can be drawn through the LED. It may be necessary to add a feedback network, such as a resistor 124 and capacitor 126 connected in series between the output and the input of the shunt regulator. The result is that if the summing voltage exceeds the driver reference voltage level, more current is drawn through the LED causing an increase in luminous output. The primary control circuit is configured so that such an increase causes it to decrease the output voltage level on the output line. In pulse width modulated power supplies, such as the flyback illustrated in FIG. 2, the on time of the power switch will decrease, thereby decreasing the output voltage.

In practicing the invention, the inverter reference voltage level, inverter gain factor, and the values of the resistors of the summing network must be selected. The particular values chosen depend upon the specific parameters of the power supply, such as the maximum output voltage level, minimum output voltage level, etc. Once the maximum and minimum levels have been selected, the proportions of the resistors of the summing network should be determined. When the output voltage level is at its maximum level, the inverter output voltage level will be zero, or very close to zero. Therefore the second and third resistors of the summing network will be virtually in parallel between the summing node and the return line voltage. Assuming that the summing voltage control point has been selected, the driver reference voltage level, and since the output voltage level is known, the proportion of the first resistor 106 to the equivalent resistance of the second and third resistors in parallel can be determined. When the output voltage level is at its minimum, the inverter output voltage level will be at its maximum, which will be about equal to the output voltage level since the inverter 68 is powered by the output voltage. This means that the first and second resistors will be virtually in parallel between the output voltage level on the output line 52 and the summing node. Knowing this, and the driver reference voltage level, it is possible to determine the proportion of the equivalent parallel resistance of the first and second resistors to the third resistor. By determining these two proportions, and then selecting any one value, or the total resistance, one can derive the necessary resistances for the other resistors in the summing network. In practice this is quickly done by choosing values and using an iterative solver, such as MathCad. Following this determination, the appropriate gain of the inverter can be selected, along with the various reference voltage levels.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, although the tracking circuit has been shown as a collection of discrete elements, it is contemplated that all of these elements may be integrated into a single monolithic integrated circuit. For example, since an opto-coupler is used in the preferred embodiment to signal the primary control circuit, integrating the tracking circuit into such a device would prove economical. In addition, while the tracking circuit is shown implemented on the secondary side of the power converter, it is contemplated that it could be implemented on the primary side with the primary control circuitry. In such a case the appropriate considerations would have to be taken to see that the feedback voltage is safely fed to the inverter.

What is claimed is:

1. A tracking circuit for a power supply, said tracking circuit responsive to a feedback voltage level $V_{fb}$, at a feedback terminal, said power supply having a primary control circuit and providing an output voltage level $V_o$ on an output line, and having a return line, said tracking circuit comprising:

an inverter having an inverter output voltage level $V_{io}$, said inverter for inverting said feedback voltage level about an inverter reference voltage level $V_{ir}$ and applying a gain factor $\beta$, where $\beta$ is greater than 1, said inverter output voltage level being equal to the lower of either $V_o$ or the value of the formula $(V_{ir}-V_{fb})\beta+V_{ir}$, and not less than zero volts;

a summing network, connected to said inverter, for combining $V_o$ and $V_{io}$ according to preselected proportions to provide a summing voltage $V_s$ at a summing node; and a driver circuit, connected to said summing network, for signaling said primary control circuit such that said summing voltage is held equal to a preselected driver reference voltage level.

2. A tracking circuit as defined by claim 1, wherein said inverter comprises:

an inverter voltage reference for providing said inverter reference voltage level;

an op-amp having an inverting input, a non-inverting input, an op-amp output, a power terminal, and a ground terminal, a feedback resistor connected between said op-amp output and said inverting input, an input resistor connected between said feedback terminal and said inverting input, said inverter voltage reference connected to said non-inverting input; and wherein said power terminal is connected to said output line of said power supply, and said ground terminal is connected to said return line of said power supply.

3. A tracking circuit as defined by claim 2, wherein said inverter voltage reference comprises:

a constant voltage diode for providing a regulated low voltage reference level; and an amplifier for amplifying said regulated low voltage reference level to provide said inverter reference voltage level.

4. A tracking circuit as defined by claim 1, wherein said summing network comprises first resistor connected between said output line and said summing node, a second resistor connected between said inverter and said summing node, and a third resistor connected between said summing node and said return line.

5. A tracking circuit as defined by claim 1, wherein said driver circuit comprises:

a driver voltage reference for providing a driver reference voltage level;

a shunt regulator responsive to said summing voltage;

a light emitting diode coupled in series with said shunt regulator and a current limiting resistor between said output line and said return line; and wherein said light emitting diode is optically coupled to said primary control circuit.

6. A tracking circuit for a power supply, said power supply providing power on an output line to a battery charger for charging a battery having a battery voltage at a feedback terminal, said power supply providing an output voltage level and having a return line, said tracking circuit comprising:

an inverter for inverting said battery voltage about an inverter reference voltage level with a gain factor greater than 1 to provide an inverter output voltage level, said inverter output voltage level not exceeding said output voltage level and not less than zero;

a summing network having a summing node for combining said inverter output voltage level and said output voltage level in preselected proportions, thereby providing a summing voltage at said summing node; and a driver circuit, connected to said summing network, for signaling a primary control circuit such that said summing voltage is held equal to a preselected driver reference voltage level; wherein said inverter comprises:

an inverter voltage reference for providing said inverter reference voltage level;

an op-amp having an inverting input, a non-inverting input, an op-amp output, a power terminal, and a ground terminal, a feedback resistor connected between said op-amp output and said inverting input, an input resistor connected between said feedback terminal and said inverting input, said inverter voltage reference connected to said non-inverting input; and wherein said power terminal is connected to said output line of said power supply, and said ground terminal is connected to said return line of said power supply.

7. A tracking circuit as defined by claim 6, wherein said inverter voltage reference comprises:

a constant voltage diode for providing a regulated low voltage reference level; and an amplifier for amplifying said regulated low voltage reference level to provide said inverter reference voltage level.

8. A tracking circuit as defined by claim 6, wherein said summing network comprises first resistor connected between said output line and said summing node, a second resistor connected between said inverter and said summing node, and a third resistor connected between said summing node and said return line.

9. A tracking circuit as defined by claim 6, wherein said driver circuit comprises:

a driver voltage reference for providing said driver reference voltage level;

a shunt regulator responsive to said summing voltage;

a light emitting diode coupled in series with said shunt regulator and a current limiting resistor between said output line and said return line; and wherein said light emitting diode is optically coupled to said primary control circuit.

* * * * *